3,439,940
CONNECTION WITH A GLASS COATED
SEALING SURFACE
Erwin J. Nunlist, Penfield, N.Y., assignor to Ritter
Pfaudler Corporation, a corporation of New York
Filed June 21, 1965, Ser. No. 465,603
Int. Cl. F16l 17/00, 55/00
U.S. Cl. 285—10           9 Claims

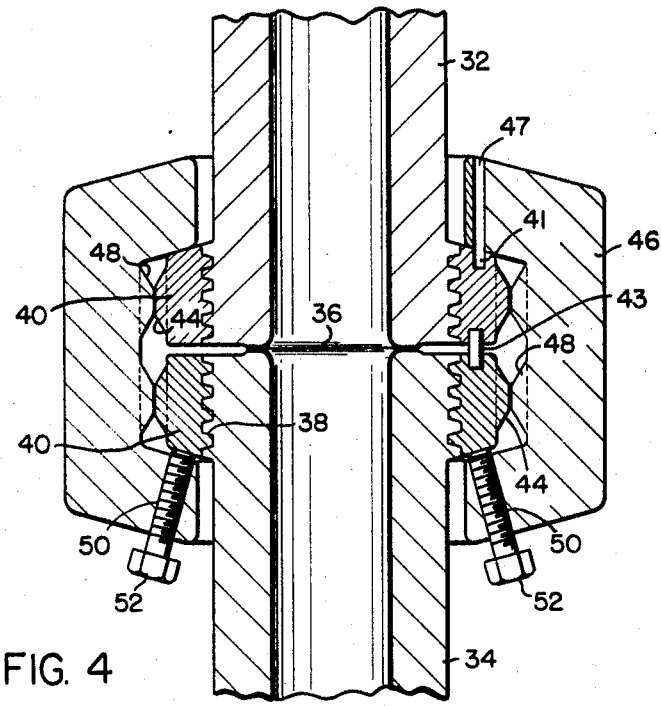
FIG. 4
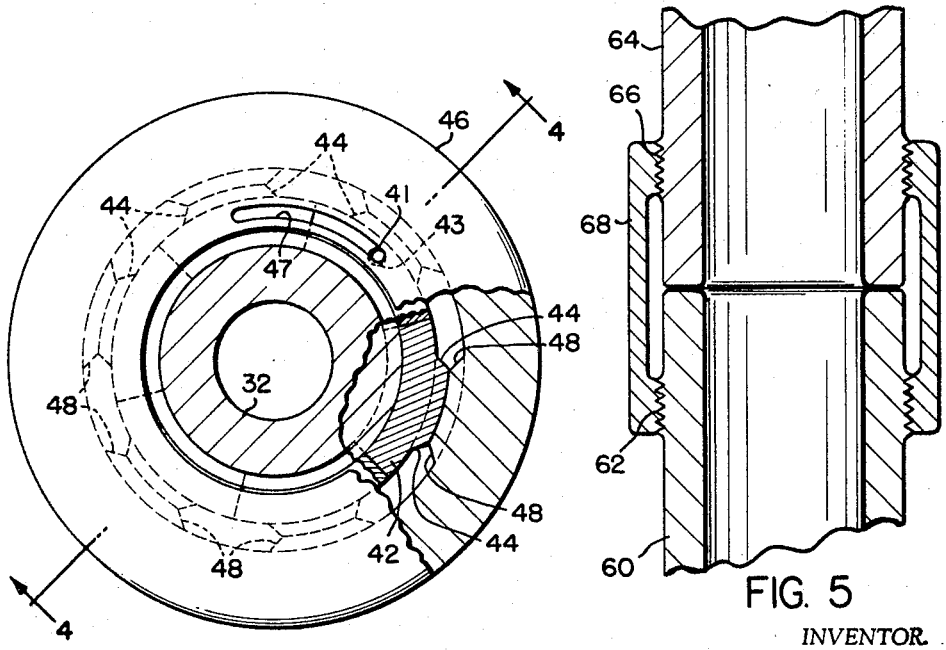
FIG. 3
FIG. 5
INVENTOR.
ERWIN J. NUNLIST
BY 
ATTORNEY United States Patent Office 3,439,940
Patented Apr. 22, 1969

ABSTRACT OF THE DISCLOSURE

A separable glass faced leakless and gasketless connection is provided for joining glass lined or coated metal sections such as for vessels, pipes, baffles or agitators, for use in high temperature, high pressure and corrosive environments, having a narrow width moderately flat annular ground glass mating surface on at least one of the sections to be joined. The glass-glass or glass-metal mating surfaces can be forced with only moderate pressure into shearless abutment and fluid tight seal using an internal and/or external arrangement of engaged threaded or flanged metal elements, through means of which the abutting nondeformable glass surfaces are neither sheared nor fractured in mating. The threaded elements are elastically deformable, which elements force the faces together with an initial fluid tight sealing load force such that the mated faces maintain fluid tight seal without glass fracture. The threaded elements by their elastic deformability and recovery automatically compensate for any increased loading forces or reduced loading forces during use to maintain a substantially nonfracturing but fluid tight loading on the faces.

---

The present invention relates generally to apparatus wherein separable fluid tight connections are necessary, and more particularly relates to separable fluid-tight gasketless connections for use in high temperature high-pressure corrosive environments.

It is often desirable to provide equipment for use in corrosive environments, having a separable connection physically located within said environment. In such cases, it is usually necessary to render these connections fluid-tight.

In the chemical field, within polymerization vessels such connections are primary sites for polymer build-up; and in the pharmaceutical field, where sanitary conditions are an absolute necessity, it has been found that these connections tend to be contamination sites. Accordingly, maintaining the integrity of these joints is of the utmost importance. Fluid-tight connections are also important in dye-producing and handling equipment.

Heretofore, separable connections have been sealed against fluids by gaskets, caulking and various plastic sealing compounds. These have uniformly proven unsatisfactory, because they develop leaks and require continual cleaning, retightening and replacement. In addition, since a prime purpose of these sealing means is compensating for any surface irregularities that would be a source of undesirable contamination sites, they generally are formed of deformable or resilient materials and have physical and chemical characteristics that differ significantly from the materials of construction of the connected members. It is the primary object of this invention to provide a means and method for separably connecting apparatus in a fluid-tight manner without gaskets; while maintaining seal integrity between the connected members under conditions of high temperatures, high pressures and adverse chemical environments.

Generally when designing fluid-containing equipment, in addition to selecting construction materials suitable for varying environments, one must select gasketing materials that will both seal and resist the environment. There are no universal gaskets that are useful at either extreme of temperature or for both alkali and acid resistance. However, a gasketless joint will eliminate the need for such a selection and the physical and chemical characteristics of the joint will be limited only by the materials of construction and the integrity of the joint. It is accordingly an object of this invention to provide a means for separably joining apparatus that approaches universal applicability.

Corrosion resistance is an essential requirement in many applications wherein separable connections are desired. For these applications, glass- or glass-ceramic-coated materials are commonly used. It is an object of this invention to provide separable gasketless fluid-tight connections for use with glass- or glass-ceramic-coated metal members.

Additionally, in contrast to connecting methods that depend upon surface deformation of a gasket or member, it is an object of this invention to seal, without gaskets, substantially nondeformable materials or attain such a seal by compressing such surfaces within the elastic limit of the materials.

I have found that narrow surfaces, of substantially nondeformable members in general, and glass- or glass-ceramic-coated members in particularly may be separably connected to form a fluid-tight seal. More specifically, I have found that pressures up to 2,500 p.s.i. may be sealed without gaskets, by machining glass mating surfaces of up to ½ inch in width until they are relatively flat, urging said surfaces into fluid tight engagement with each other, and maintaining said fluid tight engagement.

A complete understanding of the invention may be obtained from the following description and explanation which refer to the accompanying drawings illustrating the invention.

FIGURE 3 is a plan view, partly in section of a gasketless flange connection.

FIGURE 4 is a side elevational view in section along lines 4—4 of FIGURE 3.

FIGURE 5 is a side elevational view in section of another embodiment of the invention.

Figure 1:
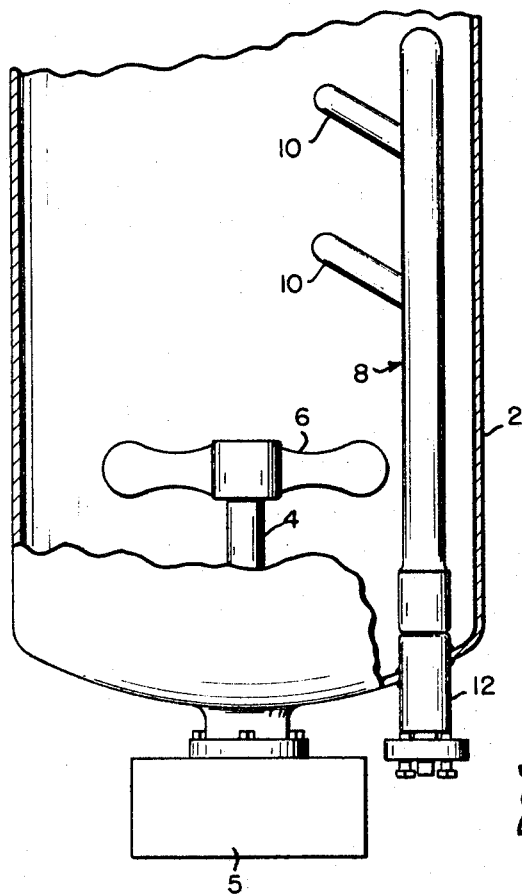
FIGURE 1 is a side elevational view partly in section of a glass-lined reactor vessel with a bottom entering agitation system therein.

Referring now to the drawings in FIGURE 1, a glass-lined corrosion resistant vessel 2 with a bottom-entering type agitation system is shown. An agitator shaft 4 driven by a motor 5 extends into said vessel 2 and terminates in an impeller 6. A glass coated baffle 8 provided with fingers 10 extends into vessel 2 through a nozzle 12 and is designed to aid the agitation.

Figure 2:
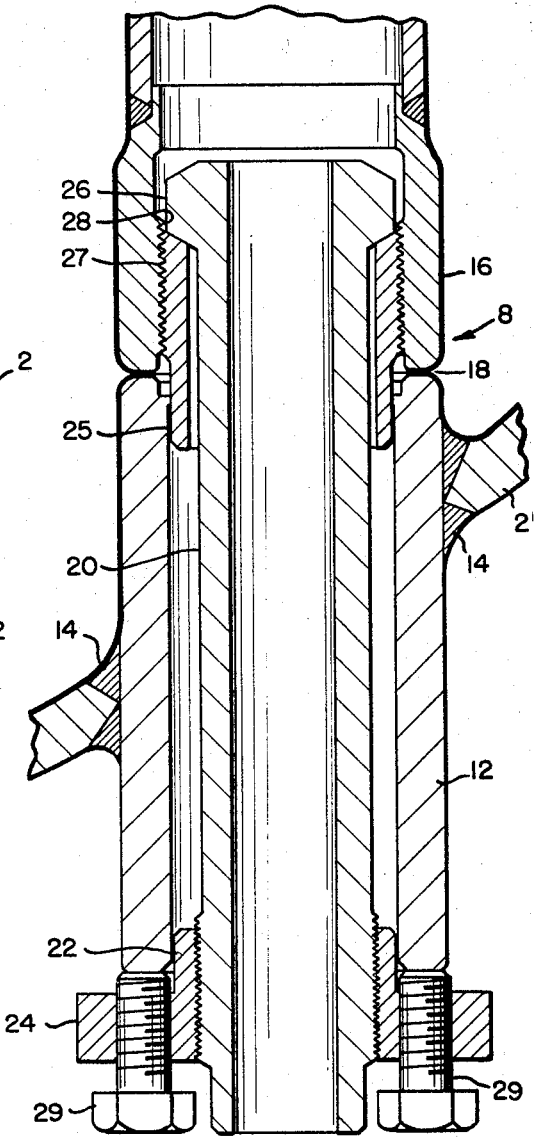
FIGURE 2 is a detailed side elevational view partly in section of a gasketless connection between a glass-lined vessel nozzle and a glass-lined baffle of a reactor vessel similar to FIGURE 1.

Referring to FIGURE 2, baffle 8, lower portion shown in detail, is positioned within vessel 2, on top of nozzle 12, which is performed by passing a section of pipe through a preformed opening in the vessel and attaching said pipe by welds 14. In the illustrated embodiment, baffle 8 and nozzle 12 are fabricated from seamless carbon steel tubing and are covered on those portions exposed to the vessel environment with a corrosion-resistant glass coating 16. Baffle 8 and nozzle 12 are provided with smoothly finished ground glass mating surfaces that meet at joint 18.

A threaded drawbar 20 extends concentrically through a threaded portion 22 of a flange 24 and the inboard end passes through a bushing 25. Drawbar 20 has projection 26 at the inboard end that is adapted to seat against a portion of bushing 25. Bushing 25 has a thread 27 on its outer circumference adapted to engage a mating thread 28 on the internal circumference of baffle 8. Flange 24, which is positioned outboard of the vessel is provided with threaded passages adapted for the receipt of bolts 29.

In assembly, drawbar 20 is inserted into bushing 25. Bushing 25 is then threaded into thread 28 of baffle 8. The baffle assembly is then lowered down to vessel nozzle 12 with drawbar 20 being concentrically located in this nozzle and projecting at the bottom end. Flange 24 is then engaged with the threads of drawbar 20 and upon positioning it properly, bolts 29 are turned to force the glass face of baffle 8 against the glass face of nozzle 12, thereby forming a rigid and tight gasketless connection as shown at 18. In a connection such as this, with the addition of a liquid film on the mating surfaces, a glass face loading of 10,000 p.s.i. has resulted in a fluid tight seal when tested at an internal pressure of 2,500 p.s.i.

FIGURES 3 and 4 are a plan view and a cross-sectional side elevational view respectively of an assembled large gasketless joint for high pressure, high temperature applications. In this embodiment two flanges 32, 34 are to be connected at glass joint 36. Flanges 32, 34 are provided with threads or grooves 38 on their outer circumferences.

Rings generally designated at 40 form a plurality of sections 42 and have a minor internal diameter less than the major external diameter of flanges 32, 34 is provided. Rings 40 are threaded or grooved on their inner surfaces to mate with grooves or threads 38 of flanges 32 and 34. Alternate raised portions 44 are provided on the outside diameter of ring 40. One ring section 42 is provided with an indentation 41 to permit movement of the assembled ring 40 in a manner to be described below. A driving pin 43 connects a section 42 within one ring 40 to a section 42 within the other ring 40 so that movement of one ring will be transmitted to the other.

A channel type flange ring 46 with an internal diameter greater than the outside diameter of rings 40 is also shown. Channel ring 46 has alternate raised portions 48 adapted to face or to fit between raised portions 44 of rings 40 as the rings rotate relative to each other in the camming action as explained below. Channel ring 46 is further provided with threaded passages 50 adapted for the receipt of bolts 52 and positioned so that bolts 52 will pass through passages 50 and abut sections 42 of rings 40. Channel ring 46 also has a slot 47 alignable with indentation 41 whereby an operator may move sectional rings 40 relative to channel ring 46.

In assembly, sectional rings 40 are positioned within channel ring 46 with raised portions 44 positioned in between raised portions 48. This permits the positioned rings 40 to be slipped over the threads 38 of flanges 32 and 34 into the proper elevation. Channel ring 46 is then rotated relative to the sectional ring 40, a camming action is effected between the inclined flanks of raised portions 44 and 48 which causes the internal threads or grooves to engage flange threads 38 and raised portions 44 and 48 to be disposed in facing relationship. Next, bolts 52 are tightened until they engage ring sections 42, and further tightened to urge flanges 32 and 34 into tight engagement with each other.

During the tightening operation, ring 40 and flanges 32 and 34 will show more elastic deformation than is encountered in the channel ring 46. For this reason relatively low initial loading will be required on the face-to-face joint. When pressure is applied to the vessel, a separating force which tends to pull the joint apart is encountered, but because of the elastic deformation of the vessel the thread portions 38 of flanges 32 and 34 and of the sectional rings 40, high forces can be absorbed before the joint will separate. Furthermore, under vessel pressure, the shell is being expanded radially and this expansion is also encountered in the flange area. If the sectional rings are pushed outward due to this radial expansion, they will slide between the inclined face and the bolt ends. When this outward sliding of the flange sections is encountered on top of the relatively fixed bolts, the joint actually becomes tighter due to the upward thrust of the thread portions of rings 40 on portions 38. Thus, the elastic deformation due to the separating force is automatically compensated by the increased loading of the bolts.

Large, ungasketed, high pressure joints cannot be made economically of standard flanges such as welding neck flanges, or threaded flanges, because the glass or ceramic-glass coating would be crushed at the contact area during the initial tightening operation of the bolts. In such joints, the flanges would be extremely rigid so that for all practical purposes no deflection would take place, and all elastic deformation would be in the bolts. Thus, the bolts would have to be tightened so that their initial loading would exceed the separating force due to the pressure in the vessel. For this reason the bolt tension would be so high that the glass at the contact area would fail.

Ideally, it would be best to design the bolting means absolutely rigid and have the flange portion elastic. The above described embodiment is a compromise in which the bolting means is more rigid than the flanges, and provides a flange joint wherein the mating glass surfaces need not be stressed beyond safe limits and the required bolt sizes may be greatly reduced.

FIGURE 5 illustrates another embodiment of a connection designed according to the present invention. In appearance, this joint is similar to an ordinary pipe coupling, however, pipe member 60 is provided with a left-hand thread 62 while the other pipe member 64 is provided with a right hand thread 66. Accordingly, turning coupling 68 will provide the axial force necessary to load the contacting glass faces.

Although joints without gaskets are known, such joints generally require either an extremely fine surface finish, such as in a mechanical seal, or extremely high surface loading, such as in press-fitted joints.

The provision of finishes, such as those required in mechanical seals is both expensive and difficult and where members of considerable size are to be joined such finishes are impractical from a manufacturing viewpoint and prohibitive from an economical viewpoint. The alternative path of extremely high surface loading does not require an extremely flat surface, but does depend upon the yield and cold forming of the materials involved. This method is particularly inapplicable to glass-coated members. The present invention bridges the gap between these two extremes and provides a heretofore unavailable means of utilizing face loading and surface finish to achieve a useful glass gasketless fluid-tight connection.

The degree of finish and quantity of face loading required are dependent upon the structural materials, the operating conditions and the fluid to be sealed. However, we have found that glass-lined faces, ground with conventional grinding equipment to a surface finish of 16 RMS, and loaded at about 10,000 p.s.i. will seal pressures greater than 2,500 p.s.i. By RMS is meant "root mean square average," as is defined at page 291, Machinery's Handbook for Machine Shop and Drafting Room, 15th edition (The Industrial Press, New York, 1954) to be in microinches calculated by the formula $$\mathrm{RMS} = \sqrt{\frac{a^2 + b^2 + c^2 \ldots}{n}}$$

wherein a, b, c, etc., are measured distances in microinches above and below a mean reference line measured from the actual surface to such line. RMS is a measurement of surface roughness. In general, it has been found that a surface roughness of less than about 32 RMS provides a useful glass surface smoothness for practice of this invention wherein the surface is flat, i.e., planar, to the degree of about 10 lightband fringes. Such lightband fringes are defined on pages 1309 to 1311 of Tool Engineers Handbook, 1st edition (McGraw-Hill, New York, 1949). Flatness, a measure of surface contour, is the product of the number of measured lightband interference fringes and the half wave length of the light used in the measuremment. For example, in the foregoing, using a monochromatic light with a fringe lightband of 11.6 microinches (half wave length), the surface flatness of the glass mating surfaces was 10 lightbands, which corresponds to a planarity with a variation of about 116 microinches from absolute planarity or flatness.

A further consideration in the design of joints according to the invention is the fact that requirements will vary in accordance with whether the medium to be sealed exerts pressure that results in greater face loading or whether it tends to separate the joint. In the separable baffle embodiment of FIGURE 2 pressure will tend to increase the face loading, therefore, a relatively low initial face loading is adequate and very high pressures may be sealed.

A large conventional flanged joint, comprising two members in face to face relationship held together by nuts and bolts, cannot seal against high pressures because of the tightening stresses of the bolts. Generally, the cross-sectional area of the flanges is considerably greater than the cross-sectional area of the bolts. As a result, the flanges are almost incompressible while the bolt has a measurable elongation. Consequently, external loading of the joint is essentially limited to the initial loading and, in the absence of a gasket, the joint will leak as soon as the pressure of the sealed medium exceeds the initial loading. A connection in accordance with the invention would permit the use of a bolt under conditions up to the full yield strength of the bolt, not only during the tightening procedure, but also when the working load is applied. Such a connection is illustrated in FIGURE 3.

In applications as described in FIGURE 5 where ease of separation might not be a primary factor, the inventive concept may be utilized by applying joining forces by mechanical means as a hydraulic ram and then using adhesives or welding and brazing techniques to bond the members while they are still under the influence of the compressive forces.

A face-to-face joint that is assembled without any fluid between the surfaces requires excessive face loading to make it gas tight. Accordingly, where gas leakage is a factor a liquid should be applied to the faces of the members to be joined and then wiped off. The removal of the film should be effected in a manner so that liquid will remain only within surface irregularities and not on the face itself. The application of a liquid film in this matter does not lessen the corrosion-resistance or affect other properties of the connection. In fact, this liquid need not be chemically resistant to the corrosive medium that is being sealed.

The achievement of the requisite degree of surface flatness and the application of the requisite pressures conveniently and without damage to the member to be joined becomes increasingly difficult as the area of the facing surfaces is increased. In practice we have found that although surfaces with larger widths can be sealed that those with widths less than about ½ inch are preferred.

The invention is particularly advantageous when used with glass- or glass-ceramic-coated metal articles. The mating surface configuration is provided in such a manner that only a relatively narrow circular band is contacting. The present invention takes advantage of the exceedingly high compressive strength of such materials and it is surprising that compressive forces can be supported by the glass lined interface that amount to twice the yield strength of the metals substrate. Further, these glass coated materials are premium items and generally used in applications where corrosive chemical resistance is of paramount importance. Accordingly, a gasketless joint is the ideal way to avoid the introduction of an additional limiting factor without necessitating the use of more expensive designs such as non-separable members or exotic metal gasketing materials. Moreover, in an application such as the baffle of FIGURE 2, wherein the joint will be subject to buffeting forces caused by the swirl of agitated fluids, the gasketless connection of substantially nondeformable glass materials has the additional advantage of not being subject to a fatigue failure as a resilient gasket would.

It is apparent that the invention achieves its stated objectives in providing a fluid-tight seal that is easily and economically produced, corrosion-resistant, and useful at high temperatures and pressures.

I claim:
1. A separable fluid-tight gasketless connection comprising:
   (a) axially aligned rigid first and second members;
   (b) substantially rigid narrow annular sealing surfaces on the adjacent ends of said members wherein at least one of said surfaces is a rigid glass coated surface, said surfaces each lying in a plane substantially normal to the axis of said members; and
   (c) means imparting a force normal to said sealing surfaces urging said sealing surfaces into a substantially shear free sealing engagement.

2. Apparatus according to claim 1 wherein said surface is finished to a roughness of less than 32 RMS and a flatness of about 10 lightbands.

3. Apparatus according to claim 1 wherein the width of said sealing surface is at most one-half inch.

4. Apparatus according to claim 1 wherein said surfaces have irregularities thereon filled with a liquid fluid film.

5. Apparatus according to claim 1 where said sealing surfaces are urged into sealing engagement with a force of about 10,000 p.s.i.

6. Fluid-tight gasketless connection comprising:
   (a) axially aligned hollow rigid first and second members;
   (b) substantially flat narrow rigid annular sealing surfaces on abutting ends of said members wherein at least one of said surface is a rigid glass coated surface;
   (c) an axially movable elongated element having a first end extending into the hollow portion of said members and engaging one of said members; and
   (d) means axially moving said element to urge said one member toward said other member whereby said sealing surfaces are urged into compressive sealing engagement within force normal to said sealing surfaces.

7. Apparatus according to claim 6 in which:
   (a) a projection is provided on said first elongated element end; and
   (b) an element is provided on the internal surface of said first member, said element having a surface engaging said projection.

8. A fluid-tight gasketless connection comprising:
   (a) axially aligned rigid hollow first and second flanged members;
   (b) substantially flat narrow rigid annular sealing surfaces formed on adjacent ends of said members wherein at least one of said surfaces is a rigid glass coated surface, said sealing surfaces lying in planes normal to said axis;
   (c) a rotatable channel housing disposed about and radially spaced from said flanged members;
   (d) a plurality of ring sections carried within said channel housing and having means thereon adapted for attachment to said flanges; and (e) means carried by said channel housing for applying opposing axial forces to said ring sections to urge said sealing surfaces of said flanged members into sealing engagement.

9. Apparatus according to claim 8 in which:
(a) a plurality of circumferentially spaced inwardly extending projections are provided on the inner periphery of said channel housing;
(b) an outwardly extending projection is provided on the outer periphery of each of said ring sections and coacting camming surfaces being provided on said inwardly and outwardly extending projections;
(c) said outwardly extending projections being adapted to fit between said inwardly extending projections when said gasketless connection is in a disassembled condition; and
(d) said inwardly extending projections being adapted to cam said outwardly extending projections inwardly to engage and lock with said flanges when said channel housing is rotated relative to said ring sections to bring said inwardly and outwardly extending projections into register during assembly of said gasketless connection.

References Cited

UNITED STATES PATENTS

| | | | |
|---|---|---|---|
| 960,377 | 6/1910 | McLean | 285—328 |
| 1,831,856 | 11/1931 | Fullman | 285—417 |
| 2,091,906 | 8/1937 | Bettis | 285—10 |
| 2,267,252 | 12/1941 | Pitsch | 285—34 |
| 2,888,783 | 6/1959 | Turnbull | 285—55 |
| 2,927,806 | 3/1960 | Lahee | 285—332.1 |
| 3,134,615 | 5/1964 | Cator | 285—341 |
| 3,135,536 | 6/1964 | Chilton | 285—187 |
| 3,207,644 | 9/1965 | Hobson et al. | 285—55 |
| 3,223,439 | 12/1965 | Stevens | 285—404 |
| 3,267,398 | 8/1966 | Van Ipecen | 285—328 |
| 3,275,359 | 9/1966 | Graff | 117—125 |
| 3,359,626 | 12/1967 | Auld et al. | 285—55 |

FOREIGN PATENTS 1,118,549  11/1961  Germany.

MARION PARSONS, JR., *Primary Examiner.*

D. W. AROLA, *Assistant Examiner.*

U.S. Cl. X.R.

285—55, 34, 158, 175, 286, 314, 364, 374, 404; 277—235; 65—59